US012673858B2

(12) United States Patent  
 Park

(10) Patent No.: US 12,673,858 B2  
(45) Date of Patent: Jul. 7, 2026

(54) INDUSTRIAL VEHICLE, NOTIFICATION SYSTEM, AND NON-TRANSITORY COMPUTER-READABLE RECORDING MEDIUM

(71) Applicant: Mitsubishi Logisnext Co., Ltd., Kyoto (JP)

(72) Inventor: Kangtae Park, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 134 days.

(21) Appl. No.: 18/789,592

(22) Filed: Jul. 30, 2024

(65) Prior Publication Data

US 2025/0320096 A1 Oct. 16, 2025

(30) Foreign Application Priority Data

Apr. 16, 2024 (JP) ................................. 2024-066007

(51) Int. Cl.
| | |
|---|---|
| *B66F 9/075* | (2006.01) |
| *B66F 9/06* | (2006.01) |
| *G06V 10/12* | (2022.01) |
| *G06V 10/25* | (2022.01) |
| *G06V 20/58* | (2022.01) |

(Continued)

(52) U.S. Cl.  
CPC ............ *B66F 9/0755* (2013.01); *B66F 9/063* (2013.01); *B66F 9/0759* (2013.01); *G06V 10/12* (2022.01); *G06V 10/25* (2022.01); *G06V 20/58* (2022.01); *G06V 20/593* (2022.01); *G06V 40/10* (2022.01); *G06V 2201/07* (2022.01)

(58) Field of Classification Search  
CPC ...... B66F 9/0755; B66F 9/063; B66F 9/0759; G06V 10/25; G06V 20/58; G06V 40/10; G06V 20/593; G06V 2201/07  
See application file for complete search history.

(56) References Cited

U.S. PATENT DOCUMENTS

| | | | |
|---|---|---|---|
| 11,052,909 B1 * | 7/2021 | Kulkarni .............. | G05D 1/0214 |
| 11,753,036 B1 * | 9/2023 | Wimmershoff ......... | B60L 50/60 |
| | | | 701/22 |

(Continued)

FOREIGN PATENT DOCUMENTS

| | | |
|---|---|---|
| EP | 0468805 | 9/1995 |
| JP | 2021033403 | 3/2021 |
| WO | 2018039556 | 3/2018 |

*Primary Examiner* — Kenneth M Dunne  
(74) *Attorney, Agent, or Firm* — JCIPRNET

(57) ABSTRACT

An industrial vehicle has a first mode and a second mode. The industrial vehicle includes: a detection device configured to detect a person and/or an object in a surrounding region of the industrial vehicle and a person in a driver's seat as a detection target; a notification device configured to output an alarm by light and/or sound; a notification control part that causes the notification device to output the alarm upon detection of the detection target by the detection device; and a mode selection part operated to cause the industrial vehicle to transition to the first mode and the second mode. The detection device includes a range setting part that sets the surrounding region as a detection range to detect the detection target without setting the driver's seat as the detection range in the first mode, and sets the driver's seat as the detection range in the second mode.

13 Claims, 4 Drawing Sheets

(51) Int. Cl.
    *G06V 20/59*         (2022.01)
    *G06V 40/10*         (2022.01)

(56)            References Cited

U.S. PATENT DOCUMENTS

| | | | |
|---|---|---|---|
| 2002/0190849 A1* | 12/2002 | Orzechowski | F16P 3/141 |
| | | | 340/425.5 |
| 2016/0264387 A1* | 9/2016 | Yoon | B66C 13/46 |
| 2018/0016127 A1* | 1/2018 | Valfridsson | B66F 17/003 |
| 2018/0057329 A1* | 3/2018 | Pöschl | B66F 17/003 |
| 2023/0074065 A1* | 3/2023 | Howells | E02F 9/085 |
| 2023/0237809 A1* | 7/2023 | Ishizaki | G06V 10/50 |
| | | | 382/103 |
| 2023/0339734 A1* | 10/2023 | Stahle | B60W 50/14 |
| 2025/0270078 A1* | 8/2025 | Qi | G01S 13/867 |

* cited by examiner

S

Imaging range of rear camera 20b                    Imaging range of front camera 20a Rear side                                           Front side

1

INDUSTRIAL VEHICLE, NOTIFICATION SYSTEM, AND NON-TRANSITORY COMPUTER-READABLE RECORDING MEDIUM

CROSS-REFERENCE TO RELATED APPLICATION

This application claims the priority benefit of Japan application serial no. 2024-066007, filed on Apr. 16, 2024. The entirety of the above-mentioned patent application is hereby incorporated by reference herein and made a part of this specification.

BACKGROUND

Technical Field

The present application relates to an industrial vehicle and a notification system. Further, the present application relates to a notification program used for the industrial vehicle or the notification system.

Related Art

For example, an industrial vehicle such as a forklift may include a detection device that detect a person or an object. For example, as described in Patent Document 1 (Japanese Patent Application Laid-Open No. 2021-33403), the detection device includes an imaging device arranged to capture an image of a surrounding region of the industrial vehicle, and an image processing part that detects presence of a person or an object in the surrounding region based on imaging data acquired by the imaging device.

In such an industrial vehicle, when the detection device detects presence of a person or an object in the surrounding region, a notification device is activated to output an alarm by sound and/or light to notify a driver of the industrial vehicle. Further, the industrial vehicle may control a travel device to perform deceleration control or stop control.

In the configuration described in Patent Document 1, before driving the industrial vehicle, the driver may perform an inspection work to check whether the detection device and the notification device are properly collaborating with each other. As an example, with the driver remaining sitting in the driver's seat of the industrial vehicle, another person stands in the surrounding region of the industrial vehicle to be intentionally detected by the detection device. At this time, if the notification device outputs an alarm, it can be confirmed that the collaboration is working correctly. However, this confirmation method requires two people.

Alternatively, with the driver leaving the driver's seat and standing in the surrounding region to be detected by the detection device, a similar confirmation work can also be performed alone. However, this method is inconvenient as the driver has to leave the driver's seat.

SUMMARY

An embodiment of the present application provides an industrial vehicle provided with a driver's seat. The industrial vehicle has a first mode and a second mode. The industrial vehicle includes a detection device, a notification device, a notification control part, and a mode selection part. The detection device is configured to detect a person and/or an object present in a surrounding region of the industrial vehicle and a person present in the driver's seat. The notification device is configured to output an alarm by light and/or sound. The notification control part causes the notification device to output the alarm upon detection of a detection target by the detection device. The mode selection part is operated for causing the industrial vehicle to transition to the first mode and the second mode. The detection device includes a range setting part that sets the surrounding region as a detection range to detect the detection target without setting the driver's seat as the detection range in the first mode, and sets the driver's seat as the detection range in the second mode.

The detection device may include an imaging device and an image processing part. The imaging device is configured to capture an image of the surrounding region and the driver's seat to acquire imaging data. The image processing part detects the detection target based on the imaging data. The range setting part may not set a region corresponding to the driver's seat in the imaging data as a region of interest of image processing performed by the image processing part in the first mode, and may set the region corresponding to the driver's seat in the imaging data as the region of interest in the second mode.

The industrial vehicle may further include a condition determination part that performs transition to the second mode upon satisfaction of at least one additional condition in addition to an operation on the mode selection part for transitioning to the second mode.

The condition determination part may set, as the at least one additional condition, detection by a brake sensor that a parking brake of the industrial vehicle is in an engaged state.

The condition determination part may set, as the at least one additional condition, detection by a seat sensor that a person is sitting in a seat of the driver's seat.

The industrial vehicle may further include a display device and a display control part. The display control part causes the display device to display the additional condition that is not satisfied, upon determination by the condition determination part that the mode selection part is operated for transitioning to the second mode but the at least one additional condition is not satisfied.

The display device may include a display of a touch panel type. The mode selection part may include a button displayed on the display.

The industrial vehicle may further include a seat sensor for detecting that a person is sitting in a seat of the driver's seat. Upon detection of a person by the detection device in the second mode, based on the seat sensor, the notification control part may output the alarm in a first configuration in a case of determining that the person is sitting in the seat, and may output the alarm in a second configuration different from the first configuration in a case of determining that the person is not sitting in the seat.

The industrial vehicle may further include a directional lever and a lever sensor. The directional lever serves to switch a travel direction of the industrial vehicle. The lever sensor serves to detect that the directional lever is at a forward position setting the travel direction to a forward direction, and that the directional lever is at a rear position setting the travel direction to a reverse direction. The imaging device may include a front camera and a rear camera. The front camera captures an image of the surrounding region on a front side of the industrial vehicle and the driver's seat. The rear camera captures an image of the surrounding region on a rear side of the industrial vehicle and the driver's seat. The detection device may further include a camera selection part. In the second mode, based on the lever sensor, the camera selection part may cause the image processing part to perform image processing on the imaging data from the front camera in a case of determining that the directional lever is at the forward position, and may cause the image processing part to perform image processing on the imaging data from the rear camera in a case of determining that the directional lever is at the rear position.

The industrial vehicle may further include a travel control part that controls a travel device of the industrial vehicle to perform deceleration control or stop control of travel upon detection of the detection target by the detection device.

The notification device may include, for example, a light that outputs light, and a horn that outputs sound.

The industrial vehicle may be, for example, a forklift.

An embodiment of the present application further provides a notification system having a first mode and a second mode. The notification system includes an industrial vehicle, a detection device, a notification device, a mode selection part, and a notification control part. The industrial vehicle is provided with a driver's seat. The detection device is provided at the industrial vehicle and is configured to detect a person and/or an object present in a surrounding region of the industrial vehicle and a person present in the driver's seat. The notification device is provided at the industrial vehicle and is configured to output an alarm by sound and/or light. The mode selection part is provided at the industrial vehicle and is operated for causing the notification system to transition to the first mode and the second mode. The notification control part causes the notification device to output the alarm upon detection of a detection target by the detection device. The detection device includes a range setting part that sets the surrounding region as a detection range to detect the detection target without setting the driver's seat as the detection range in the first mode, and sets the driver's seat as the detection range in the second mode.

An embodiment of the present application further provides a notification program used for the above industrial vehicle or the above notification system including a computer. The notification program causes the computer to function as the notification control part and the range setting part.

DESCRIPTION OF EMBODIMENTS

Embodiments of the present application provide an industrial vehicle and a notification system that enable a driver to confirm collaboration between a detection device and a notification device without leaving a driver's seat. Further, an embodiment of the present application provides a notification program used therefor.

Hereinafter, embodiments of the disclosure will be described with reference to the accompanying drawings. The following examples of the disclosure are simply illustrative. The drawings are simply schematic and may not be drawn to scale. It should also be understood that throughout the drawings, same reference signs are used to denote same or similar components.

Figure 1:
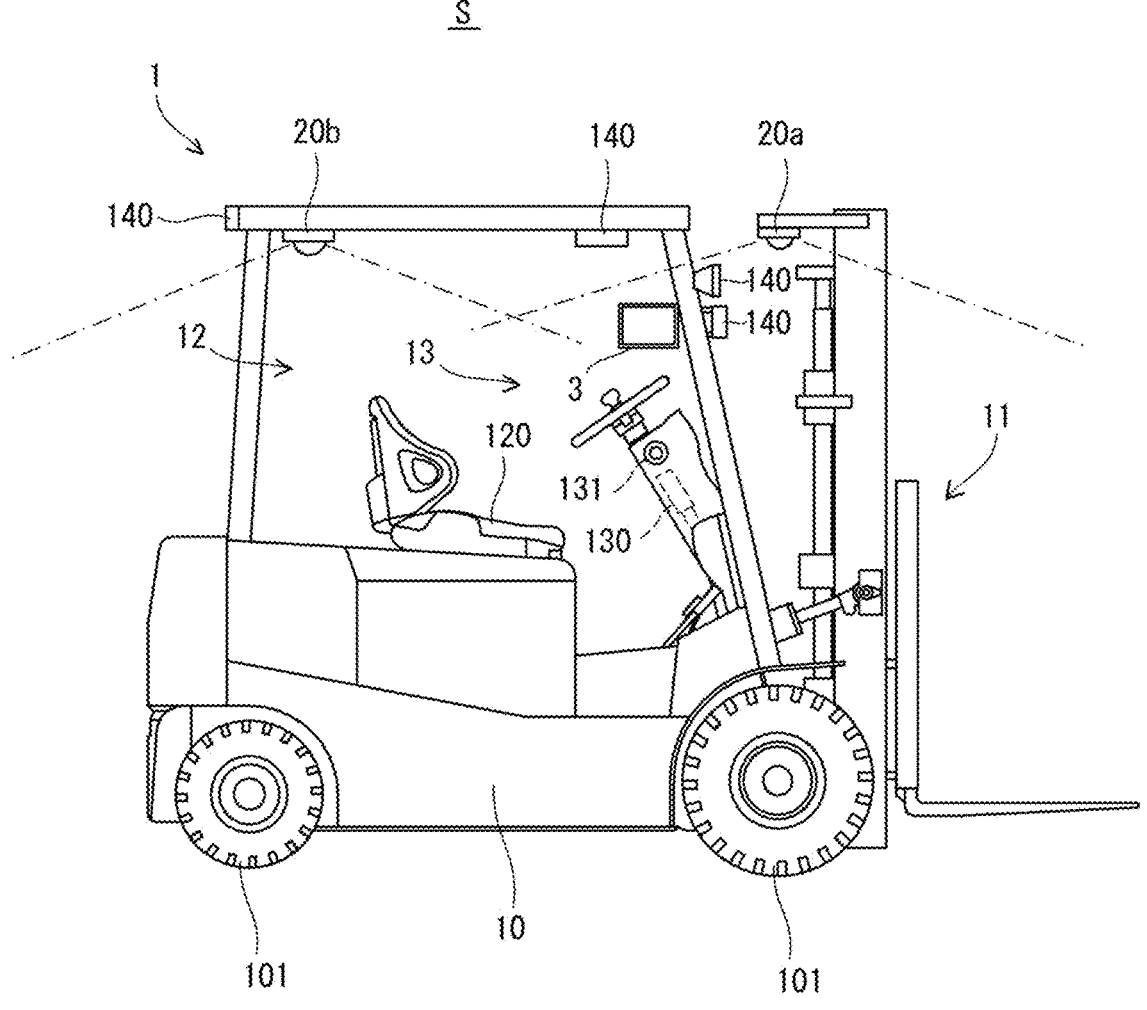
FIG. 1 is a schematic side view showing an exemplary industrial vehicle/notification system.

FIG. 1 illustrates an industrial vehicle 1. In this example, the industrial vehicle 1 is a cargo handling vehicle, more specifically, a forklift. The industrial vehicle 1 is a counter-balance type forklift in the illustration of FIG. 1, but may also be a reach type forklift. Further, the industrial vehicle 1 may also be a vehicle other than a cargo handling vehicle.

The industrial vehicle 1 includes a vehicle body 10 provided to be capable of traveling by travel wheels 101, and a cargo handling device 11 (e.g., forks, mast devices, etc.) provided at a front side of the vehicle body 10. The vehicle body 10 includes a driver's seat 12 having a seat 120 in which a driver sits during driving, and an operation part 13 provided at the driver's seat 12. The operation part 13 includes a brake lever 130 of a parking brake, a directional lever 131, etc. (to be described later), in addition to a steering wheel, cargo handling levers, and brake pedals.

The industrial vehicle 1 includes at least one light 140. Herein, the light 140 may be a headlight, a turn signal, a combination light, a rotating beacon, a headlamp, a spotlight, etc.

Figure 2:
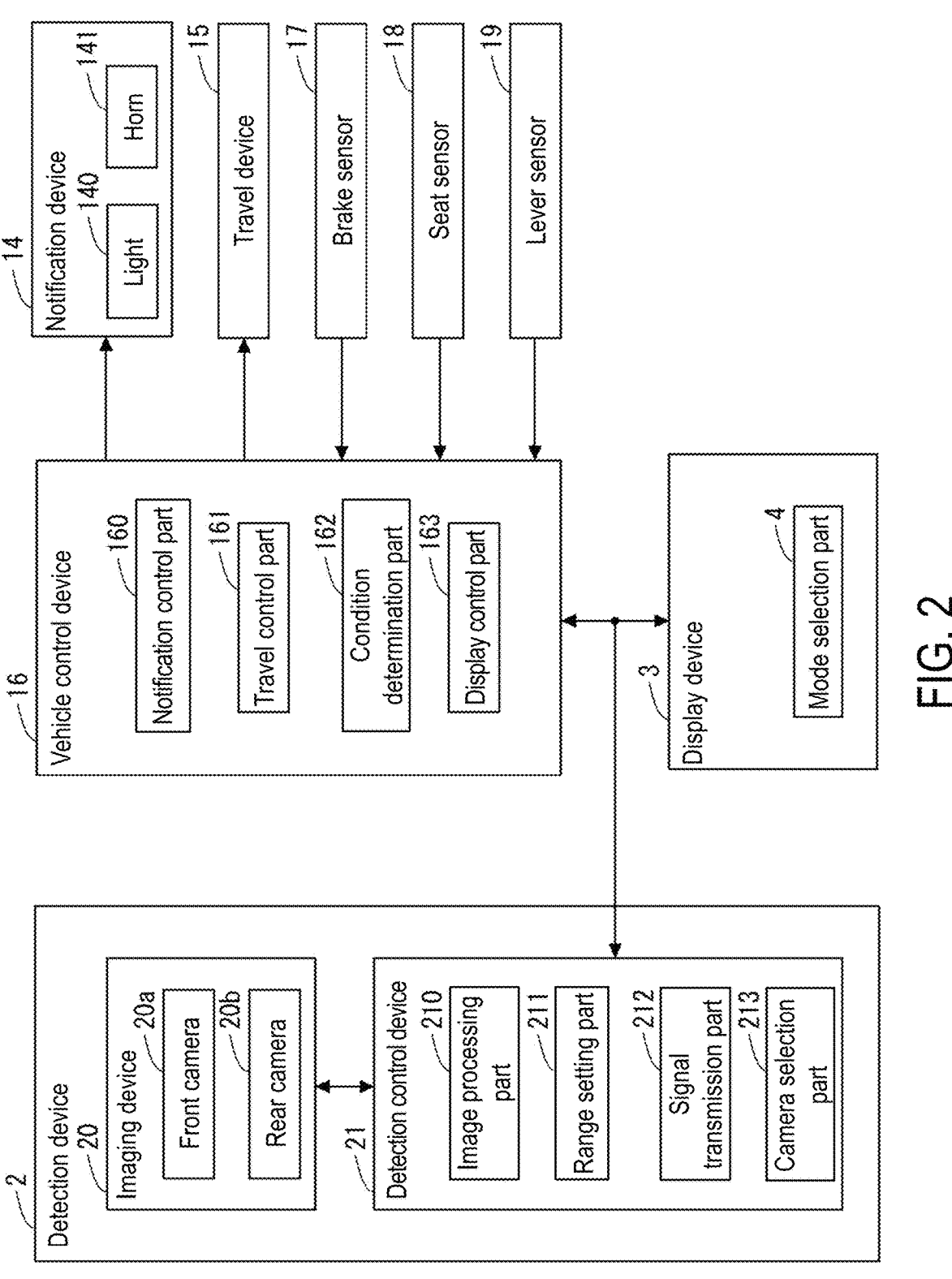
FIG. 2 is an exemplary block diagram of the industrial vehicle/notification system for performing a notification action.

The industrial vehicle 1 has a function of detecting presence of a person or an object, outputting an alarm, and performing travel control, in the case where the person or the object is present in a surrounding region of the industrial vehicle 1 during operation. Configurations for serving this function will be described below with reference to FIG. 2.

The industrial vehicle 1 includes a notification device 14. The notification device 14 is configured to output an alarm by sound and/or light. In this example, the notification device 14 is composed of one or more of the lights 140 in FIG. 1 which output light and are standard equipment on the industrial vehicle 1, and a horn 141 which outputs sound and is standard equipment on the industrial vehicle 1.

The industrial vehicle 1 includes a travel device 15. The travel device 15 is composed of a drive system that drives and steers the travel wheels 101 (FIG. 1) and serves to cause the vehicle body 10 to travel.

The industrial vehicle 1 includes a detection device 2. The detection device 2 is configured to detect a person or an object present in the surrounding region of the industrial vehicle 1 and a person present in the driver's seat 12. The detection device 2 includes an imaging device 20 configured to capture an image of at least the surrounding region and the driver's seat 12 to acquire imaging data. The imaging device 20 includes at least one camera. In this example, the imaging device 20 is composed of a plurality of cameras, more specifically, a front camera 20a and a rear camera 20b.

In this example, the front camera 20a and the rear camera 20b are half celestial sphere cameras with a 360° field of view. The front camera 20a is attached to a front part of the industrial vehicle 1 (top part of a mast of the cargo handling device 11 in FIG. 1), such that at least the driver's seat 12 and the surrounding region on the front side of the industrial vehicle 1 are set as an imaging range. The rear camera 20b is attached to a rear part of the industrial vehicle 1 (rear part of a head guard of the driver's seat 12 in FIG. 1), such that at least the driver's seat 12 and the surrounding region on the rear side of the industrial vehicle 1 are set as an imaging range.

Figure 3:
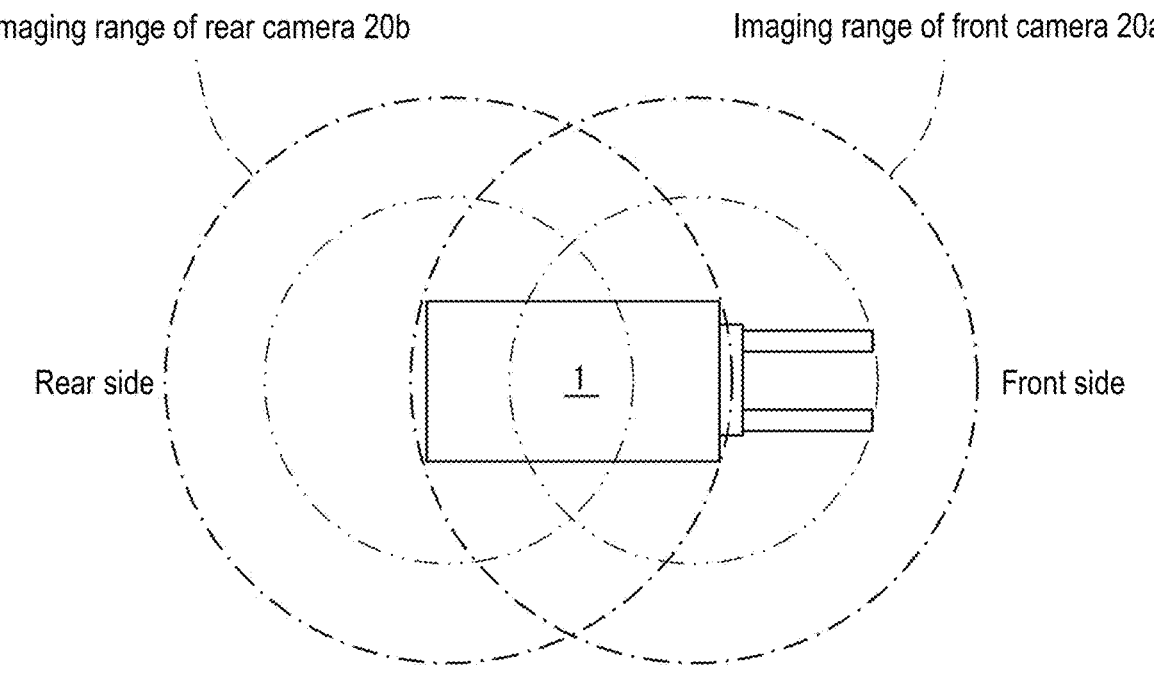
FIG. 3 is a schematic view for illustrating an imaging range of an imaging device.

Accordingly, as shown in FIG. 3, the detection device 2 can set an entire circumference of the surrounding region as an imaging range, i.e., as a detectable range. The cameras are not limited to half celestial sphere cameras. The number of cameras may also be one or three or more. Furthermore, the attachment positions are not necessarily limited to those shown in FIG. 1. These factors are determined as appropriate according to the type and structure of the industrial vehicle.

The detection device 2 includes a detection control device 21 connected to the imaging device 20. The detection control device 21 includes a computer having an arithmetic device, a storage device, and a memory. The storage device stores a program for causing the computer to function as the following functional parts 210 to 213 of the detection control device 21.

The detection control device 21 includes an image processing part 210, a range setting part 211, and a signal transmission part 212.

The image processing part 210 detects a person or an object as a detection target based on the imaging data acquired according to image capturing performed by the cameras 20a and 20b of the imaging device 20.

As will be described later, the range setting part 211 sets a detection range to actually perform detection within the detectable range according to a mode. In other words, the range setting part 211 sets a non-detection range in which detection is not performed within the detectable range. In this example, the range setting part 211 sets a region of interest (ROI) to which image processing performed by the image processing part 210 is applied in the imaging data. This will be described later.

The signal transmission part 212 transmits a detection signal to a vehicle control device 16 (to be described later) when the image processing part 210 detects a detection target.

The industrial vehicle 1 includes a vehicle control device 16 that controls an action of the industrial vehicle 1. The vehicle control device 16 is provided in the vehicle body 10 and is communicatively connected to the detection device 2 and a display device 3 (to be described later). The vehicle control device 16 includes a computer having an arithmetic device, a storage device, and a memory. The storage device stores a program for causing the computer to function as the following functional parts 160 to 163 of the vehicle control device 16.

The vehicle control device 16 includes a notification control part 160 and a travel control part 161.

In response to a detection signal from the detection device 2, the notification control part 160 controls the notification device 14 and causes the notification device 14 to output an alarm by sound and/or light. In this example, in response to reception of a detection signal from the detection device 2, the notification control part 160 activates the light 140 to output light and/or activates the horn 141 to output sound. Further, in this example, since the light 140 and the horn 141 are standard equipment, the notification control part 160 may also turn the light 140 on/off or activate the horn 141 in response to an operation on the operation part 13 (FIG. 1) performed by the driver.

The travel control part 161 controls the travel device 15 to perform deceleration control and/or stop control of travel of the industrial vehicle 1. Further, the travel control part 161 controls an action of the travel device 15 in response to an input from the operation part 13, and accordingly the driver can cause the industrial vehicle 1 to travel.

The industrial vehicle 1 has a normal mode (first mode) and an inspection mode (second mode) as detection modes. The industrial vehicle 1 includes a mode selection part 4 (FIG. 2) operated by the driver to cause the industrial vehicle 1 to transition to the normal mode, the inspection mode, and a state in which the detection function is completely unused.

The industrial vehicle 1 further includes a display device 3. The display device 3 includes a touch panel display and also functions as a user interface. The mode selection part 4 may be composed of one or more buttons displayed on the display, for example. Alternatively, the mode selection part 4 may be composed of one or more mechanical switches or buttons. The mode selection part 4 is provided at a position operable by the driver in a state sitting in the seat 120. For example, the display device 3 including the mode selection part 4 is provided at the operation part 13 of the driver's seat 12 (see FIG. 1).

[Normal Mode (First Mode)]

Upon selection of the normal mode by the mode selection part 4, in response thereto, the industrial vehicle 1 transitions to the normal mode and performs the following control. Similar to Patent Document 1 or the like, the normal mode is a mode of performing detection of a person or an object in the surrounding region of the industrial vehicle 1, and upon detection, outputting an alarm, performing travel control, and notifying the driver accordingly.

In the normal mode, the range setting part 211 does not set a region corresponding to the driver's seat 12 as the region of interest of image processing performed by the image processing part 210 within the imaging data captured by the imaging device 20 (cameras 20a and 20b), but sets only the surrounding region excluding the industrial vehicle 1 as the region of interest. That is, in the normal mode, the detection device 2 sets the driver's seat 12 as the non-detection range and sets only the surrounding region as the detection range.

By performing conventional image processing on the region of interest in the imaging data, the image processing part 210 detects a detection target (person and/or object) in the case where the detection target is present in the surrounding region. The image processing part 210 may also apply a predetermined algorithm to perform image processing that exclusively detects a person. Further, the image processing part 210 may also detect a person by inputting the imaging data into a human recognition model generated by machine learning.

The signal transmission part 212 transmits a detection signal to the vehicle control device 16 upon detection of a detection target.

In response to receiving the detection signal, the notification control part 160 outputs an alarm by sound and/or light via the notification device 14 (light 140 and/or horn 141). At the same time, in response to receiving the detection signal, the travel control part 161 performs deceleration control and/or stop control via the travel device 15. Accordingly, the driver and the person present nearby can be notified of danger, and contact between the industrial vehicle 1 and the person or the object can be avoided.

In the normal mode, the image processing part 210 may also calculate a distance (hereinafter referred to as a detection distance) from the camera 20a/20b to the detection target upon detection of the detection target. Then, the notification control part 160 and the travel control part 161 may change a control pattern based on the detection distance. In other words, the alarm control and the travel control may vary according to a level of danger.

As an example, in FIG. 3, the signal transmission part 212 may transmit a first detection signal when the detection distance is within a range between a double-dot dash line and a one-dot dash line, and transmit a second detection signal when the detection target is within a range of the double-dot dash line. The notification control part 160 varies the alarm control and the travel control part 161 varies the travel control depending on receiving the first detection signal (low level of danger) or the second detection signal (high level of danger).

For example, depending on receiving the first detection signal or the second detection signal, the notification control part 160 may vary whether to turn on the light 140, whether to keep the light on or flashing, a flashing cycle, or a lighting pattern, and/or may vary whether to sound the horn 141, a volume of the horn, or a sounding pattern. As a more specific example, the notification control part 160 may shorten the flashing cycle of the light 140 in the case of the second detection signal compared to the flashing cycle of the light 140 in the case of the first detection signal. In another example, with the light 140 illustrated as a combination lamp, the notification control part 160 may cause the light 140 to be on or flash in yellow in the case of the first detection signal, and cause the light 140 to be on or flash in red in the case of the second detection signal.

For example, the travel control part 161 performs deceleration control in the case of the first detection signal, and performs stop control in the case of the second detection signal.

[Inspection Mode (Second Mode)]

Upon selection of the inspection mode by the mode selection part 4, in response thereto, the industrial vehicle 1 transitions to the inspection mode and performs the following control. The inspection mode is a mode for confirming whether communication between the detection device 2 and the vehicle control device 16 is properly established and whether the detection device 2 and the notification device 14 can collaborate as described in the normal mode.

The range setting part 211 sets a region corresponding to the driver's seat 12 in the imaging data as a region of interest. In other words, different from the normal mode, in the inspection mode, the detection device 2 sets the driver's seat 12 as the detection range. In the inspection mode, since the region of interest may be any region as long as it includes the region corresponding to the driver's seat 12, for example, the entire region of the imaging data may also be set as the region of interest.

The image processing part 210 performs human detection by applying conventional human recognition image processing techniques to the set region of interest in the imaging data. Thus, if the driver is present in the driver's seat 12, the driver will be detected.

Upon detection of a person by the image processing part 210, the signal transmission part 212 transmits a detection signal to the vehicle control device 16.

In response to receiving the detection signal, the notification control part 160 causes the notification device 14 (light 140 and/or horn 141) to output an alarm by light and/or sound.

The inspection mode is utilized by the driver as follows. First, the driver sits in the seat 120 of the driver's seat 12, and operates the mode selection part 4 to cause the industrial vehicle 1 to transition to the inspection mode. Then, as described above, the detection device 2 detects the driver in the driver's seat 12, and the notification device 14 outputs sound and/or light. By confirming the sound and/or light, the driver can confirm that the detection device 2 is working properly, communication between the detection device 2 and the vehicle control device 16 is established, and the detection device 2 and the notification device 14 can collaborate with each other.

Then, after such an inspection work, the driver operates the mode selection part 4 to select the normal mode, switch the industrial vehicle 1 from the inspection mode to the normal mode, and starts drive of the industrial vehicle 1. With safety confirmation performed using the inspection mode, the driver can use the normal mode with confidence. In the normal mode, since the driver's seat 12 is not set as the detection range, the detection device 2 will not detect the driver in the driver's seat 12.

In this manner, by adopting the inspection mode (second mode) in the industrial vehicle 1, the driver can perform an inspection work alone without leaving the driver's seat 12. That is, the embodiment eliminates the need for the driver to leave the driver's seat 12 and enter the detection range of the detection device 2 as in the conventional art. The driver can easily perform the inspection work.

In the inspection mode, the travel control part 161 may perform deceleration control or stop control in response to the detection signal. However, since the inspection mode is used with the industrial vehicle 1 in a stopped state, the driver cannot confirm an output of the travel control. Nevertheless, if the communication between the detection device 2 and the vehicle control device 16 can be confirmed and it can be confirmed that the detection device 2 and the notification device 14 can collaborate with each other, it can be inferred that the detection device 2 and the travel device 15 can also collaborate with each other.

Further functions will be described below.

[Transition to Inspection Mode (Second Mode)]

As described above, transition to the inspection mode is performed when the mode selection part 4 (switch or button) is operated. For example, in addition to this, at least one additional condition may be set for the transition to the inspection mode. Thus, transition to the inspection mode may be performed when the mode selection part 4 is operated to transition to the inspection mode and when the additional condition is satisfied.

For example, the additional condition may be that the parking brake (not shown) is in an engaged state. For this purpose, the industrial vehicle 1 includes a brake sensor 17 (FIG. 2) for detecting an engaged state of the parking brake. The brake sensor 17 may be a limit switch or the like detecting that the brake lever 130 (FIG. 1) of the parking brake is pulled to a position engaging the parking brake.

The industrial vehicle 1 includes a condition determination part 162 in the vehicle control device 16 to determine whether a condition for transitioning to the inspection mode is satisfied. The condition determination part 162 determines whether the additional condition is satisfied when the mode selection part 4 is operated to transition to the inspection mode. In this example, the condition determination part 162 determines whether the parking brake is in the engaged state based on the signal from the brake sensor 17.

When determining that the parking brake is in the engaged state, the condition determination part 162 causes the industrial vehicle 1 to transition to the inspection mode. On the other hand, when determining that the additional condition is not satisfied, the condition determination part 162 does not perform the transition to the inspection mode.

Further, in addition to or instead of the parking brake being in the engaged state, the additional condition may be that a person (driver) is sitting in the seat 120 of the driver's seat 12. For this purpose, the industrial vehicle 1 includes a seat sensor 18 (FIG. 2) that detects whether a person is sitting in the seat 120. The seat sensor 18 may be a switch that turns on when a person sits in the seat 120, or may be a load sensor. The condition determination part 162 determines whether a person is sitting in the seat 120 based on the signal from the seat sensor 18 when the mode selection part 4 is operated to transition to the inspection mode.

The above additional conditions are simply illustrative examples. Further, in the case where two or more additional conditions are set, the condition determination part 162 performs transition to the inspection mode if all additional conditions are satisfied.

In the case where the additional conditions are not satisfied when the mode selection part 4 is operated to transition to the inspection mode, the unsatisfied additional condition may be displayed on the display device 3. For this purpose, the industrial vehicle 1 includes a display control part 163 in the vehicle control device 16.

Figure 4:
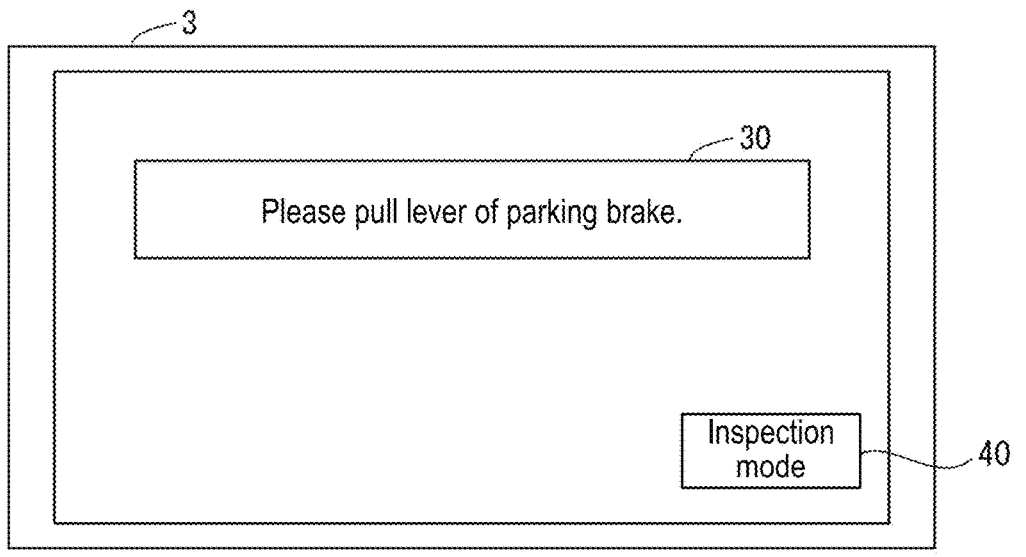
FIG. 4 illustrates a message displayed on a display device.

As an example, as shown in FIG. 4, although the button 40 for transitioning to the inspection mode constituting the mode selection part 4 displayed on the display device 3 has been operated by the driver, when the condition determination part 162 determines that the parking brake is not in the engaged state (additional condition is not satisfied), the display control part 163 may display a message 30 on the display device 3 stating "Please pull lever of parking brake." (meaning "please engage the parking brake").

By confirming this message 30, the driver realizes that the condition for transitioning to the inspection mode is not satisfied and will take action to satisfy the condition, which is very user-friendly.

Subsequently, when the additional condition is satisfied and the transition to the inspection mode is executed, the display control part 163 may remove the display content (message 30) from the display of the display device 3. Accordingly, the driver can confirm that the transition to the inspection mode has been performed.

The display control part 163 may also display on the display device 3 in which mode/state the industrial vehicle 1 is, among the normal mode, the inspection mode, and a state in which the detection device 2 is in neither of the modes and is not in use.

[Alarm Configuration of Inspection Mode]

The seat sensor 18 may also be used in alarm control in the inspection mode rather than being used for transitioning to the inspection mode. For example, the notification control part 160 determines whether the driver is sitting in the seat 120 based on the signal from the seat sensor 18 upon detection of the driver in the driver's seat 12 (upon reception of a detection signal) in the inspection mode.

As a result of the determination, the notification control part 160 causes the notification device 14 to output an alarm in a first configuration when the driver is sitting in the seat 120, and output an alarm in a second configuration different from the first configuration when the driver is not sitting in the seat 120. By confirming the alarm of the second configuration, the driver can recognize that he/she is not performing the inspection work in a state properly sitting in the seat 120. Configurations of the output of sound and/or light differ from each other in the alarm of the first configuration and the alarm of the second configuration, and the alarm of the second configuration preferably has a stronger output that more significantly attracts attention of the driver than the alarm of the first configuration.

[Selection of Camera in Inspection Mode]

In this example, two cameras including the front camera 20a and the rear camera 20b are used. Both cameras 20a and 20b include the driver's seat 12 in their imaging ranges. In the inspection mode, the detection device 2 illustrated above performs image processing on the imaging data of both cameras and detects a person in the driver's seat 12 in both imaging data. In the case where a malfunction is present in one of the cameras, there is a possibility that the malfunction may not be noticed. As shown in FIG. 3, since a range in which the imaging ranges of the front camera 20a and the rear camera 20b do not overlap is large in the surrounding region of the industrial vehicle 1, a malfunction of the camera may hinder the proper action in the normal mode.

Thus, the industrial vehicle 1 may also include configurations capable of separately confirming the front camera 20a and the rear camera 20b in the inspection mode.

For this purpose, the embodiment uses a directional lever 131 (FIG. 1) for switching the travel direction of the industrial vehicle 1 between a forward direction and a reverse direction, and a lever sensor 19 (FIG. 2) for detecting whether the directional lever 131 is at a forward position setting the travel direction to the forward direction or a rear position setting the travel direction to the reverse direction. The lever sensor 19 may be composed of a plurality of limit switches, for example.

The detection device 2 includes a camera selection part 213 in the detection control device 21. The detection device 2 acquires a signal from the lever sensor 19 via the vehicle control device 16. Then, the camera selection part 213 determines whether the directional lever 131 is at the forward position or the rear position based on the signal from the lever sensor 19 in the second mode.

As a result of the determination, when the directional lever 131 is at the forward position, the camera selection part 213 causes the image processing part 210 to perform image processing on the imaging data from the front camera 20a to perform human detection (without using the imaging data from the rear camera 20b for image processing). Conversely, when the directional lever 131 is at the rear position, the camera selection part 213 causes the image processing part 210 to perform image processing on the imaging data from the rear camera 20b to perform human detection (without using the imaging data from the front camera 20a for image processing).

According to this configuration, in the inspection mode, if the driver in the driver's seat 12 can confirm the alarm from the notification device 14 when moving the directional lever 131 to the forward position, the driver can confirm that there are no issues with the front camera 20a. On the other hand, if the driver can confirm the alarm from the notification device 14 when moving the directional lever 131 to the rear position, the driver can confirm that there are no issues with the rear camera 20b.

The above embodiment may also be regarded as a notification system S (FIG. 1) including the industrial vehicle 1 as well as the detection device 2, the display device 3, the mode selection part 4, the notification device 14, the notification control part 160, etc. mounted on the industrial vehicle 1.

The detection device 2 may also detect a detection target in the surrounding region and the driver's seat 12 using one or more area sensors instead of the cameras 20a and 20b and the image processing part 210. In that case, the range setting part 211 may control the area sensor to change a detection range of the area sensor in the normal mode (first mode) and the inspection mode (second mode) as described in the above embodiment.

Figure 5:
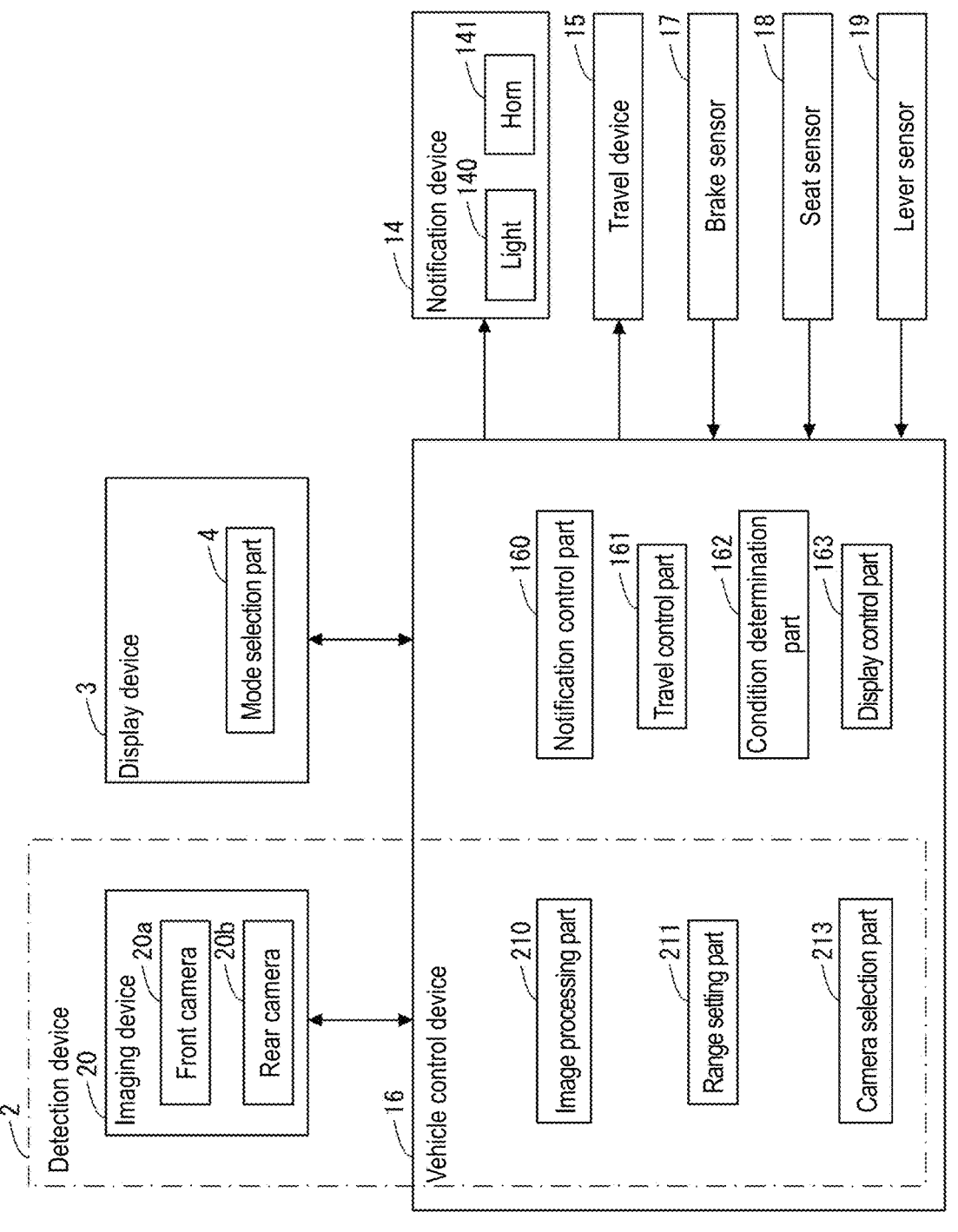
FIG. 5 is another exemplary block diagram of an industrial vehicle/notification system for performing a notification action.

In the industrial vehicle 1/notification system S, as shown in FIG. 5, the detection device 2 may also be composed of the imaging device 20 and the vehicle control device 16. That is, in this embodiment, the vehicle control device 16 also serves as the detection control device 21 in FIG. 2. In that case, the imaging device 20 is connected to the vehicle control device 16. In the vehicle control device 16, the storage device stores a notification program that causes the computer to function as the image processing part 210, the range setting part 211, the camera selection part 213, the notification control part 160, the travel control part 161, the condition determination part 162, and the display control part 163.

In the embodiment in FIG. 5, as in the previous embodiment, the driver can confirm the collaboration between the detection device 2 and the notification device 14 alone without leaving the driver's seat 12.

Although the disclosure has been illustrated above, the disclosure is not limited to the above embodiments.

What is claimed is:

1. An industrial vehicle provided with a driver's seat, the industrial vehicle having a first mode and a second mode, the industrial vehicle comprising:

a detection device which includes a camera and is configured to detect at least one of a person or an object present in a surrounding region of the industrial vehicle and a person present in the driver's seat;

a notification device configured to output an alarm by at least one of light or sound;

a first processor configured to function as:

a notification control part that causes the notification device to output the alarm upon detection of a detection target by the detection device; and a mode selection part comprising at least one of a button displayed on a display or a mechanical switch operated for causing the industrial vehicle to transition to the first mode and the second mode, wherein the detection device comprises a second processor configured to function as:

a range setting part that sets the surrounding region as a detection range to detect the detection target without setting the driver's seat as the detection range in the first mode, and sets the driver's seat as the detection range in the second mode; and first processor is further configured to function as:

a condition determination part that performs transition to the second mode upon satisfaction of at least one additional condition in addition to an operation on the mode selection part for transitioning to the second mode, wherein the condition determination part sets, as the at least one additional condition, detection by a seat sensor that a person is sitting in a seat of the driver's seat.

2. The industrial vehicle according to claim 1, wherein the detection device comprises:

an imaging device configured to capture an image of the surrounding region and the driver's seat to acquire imaging data; and an image processing part that detects the detection target based on the imaging data, and the range setting part does not set a region corresponding to the driver's seat in the imaging data as a region of interest of image processing performed by the image processing part in the first mode, and sets the region corresponding to the driver's seat in the imaging data as the region of interest in the second mode.

3. The industrial vehicle according to claim 2, further comprising:

a directional lever for switching a travel direction of the industrial vehicle; and a lever sensor for detecting that the directional lever is at a forward position setting the travel direction to a forward direction, and that the directional lever is at a rear position setting the travel direction to a reverse direction, wherein the imaging device comprises:

a front camera that captures an image of the surrounding region on a front side of the industrial vehicle and the driver's seat; and a rear camera that captures an image of the surrounding region on a rear side of the industrial vehicle and the driver's seat, the detection device further comprises:

a camera selection part, and in the second mode, based on the lever sensor, the camera selection part:

causes the image processing part to perform image processing on the imaging data from the front camera in a case of determining that the directional lever is at the forward position, and causes the image processing part to perform image processing on the imaging data from the rear camera in a case of determining that the directional lever is at the rear position.

4. The industrial vehicle according to claim 1, wherein the condition determination part sets, as the at least one additional condition, detection by a brake sensor that a parking brake of the industrial vehicle is in an engaged state.

5. The industrial vehicle according to claim 1, further comprising:

a display device; and a display control part that causes the display device to display the additional condition that is not satisfied, upon determination by the condition determination part that the mode selection part is operated for transitioning to the second mode but the at least one additional condition is not satisfied.

6. The industrial vehicle according to claim 5, wherein the display device comprises a display of a touch panel type, and the mode selection part comprises a button displayed on the display.

7. The industrial vehicle according to claim 1, further comprising:

a seat sensor for detecting that a person is sitting in a seat of the driver's seat, and upon detection of a person by the detection device in the second mode, based on the seat sensor, the notification control part:

outputs the alarm in a first configuration in a case of determining that the person is sitting in the seat, and outputs the alarm in a second configuration different from the first configuration in a case of determining that the person is not sitting in the seat.

8. The industrial vehicle according to claim 1, further comprising:

a travel control part that controls a travel device of the industrial vehicle to perform deceleration control or stop control of travel upon detection of the detection target by the detection device.

9. The industrial vehicle according to claim 1, wherein the notification device comprises:

a light that outputs light; and a horn that outputs sound.

10. The industrial vehicle according to claim 1, wherein the industrial vehicle is a forklift.

11. A notification system having a first mode and a second mode, the notification system comprising:

a detection device which includes a camera and is and configured to detect at least one of a person or an object present in a surrounding region of the industrial vehicle and a person present in a driver's seat of an industrial vehicle;

a notification device provided at the industrial vehicle and configured to output an alarm by at least one of sound or light;

a first processor configured to function as a mode selection part comprising at least one of a button displayed on a display or a mechanical switch operated for causing the notification system to transition to the first mode and the second mode; and a notification control part that causes the notification device to output the alarm upon detection of a detection target by the detection device, wherein the detection device comprises a second processor configured to function as:

a range setting part that sets the surrounding region as a detection range to detect the detection target without setting the driver's seat as the detection range in the first mode, and sets the driver's seat as the detection range in the second mode; and first processor is further configured to function as:

a condition determination part that performs transition to the second mode upon satisfaction of at least one additional condition in addition to an operation on the mode selection part for transitioning to the second mode, wherein the condition determination part sets, as the at least one additional condition, detection by a seat sensor that a person is sitting in a seat of the driver's seat.

12. A non-transitory computer-readable recording medium recording a notification program used for the industrial vehicle according to claim 1 comprising a computer, the notification program causing the computer to function as the notification control part and the range setting part.

13. A non-transitory computer-readable recording medium recording a notification program used for the notification system according to claim 11 comprising a computer, the notification program causing the computer to function as the notification control part and the range setting part.

\* \* \* \* \*